United States Patent [19]

Connell et al.

[11] Patent Number: 5,678,227
[45] Date of Patent: *Oct. 14, 1997

[54] APPARATUS AND METHOD FOR MINIMIZING THE TURN ON TIME FOR A RECEIVER OPERATING IN A DISCONTINUOUS RECEIVE MODE

[75] Inventors: Lawrence E. Connell, Naperville; Kenneth A. Paitl, East Dundee; William J. Roeckner, Algonquin; Kenneth R. Haddad, Arlington Heights, all of Ill.

[73] Assignee: Motorola, Inc., Schaumburg, Ill.

[*] Notice: The term of this patent shall not extend beyond the expiration date of Pat. No. 5,551,078.

[21] Appl. No.: 282,668

[22] Filed: Jul. 29, 1994

[51] Int. Cl.⁶ .................................................. H04Q 7/18
[52] U.S. Cl. .................. 455/343; 455/38.3; 340/825.44; 370/311
[58] Field of Search ................... 455/343, 38.3, 455/127; 379/63, 57; 370/95.1, 311, 313; 340/825.44, 311.1; 327/87, 73, 77, 67

[56] References Cited

U.S. PATENT DOCUMENTS

| | | | |
|---|---|---|---|
| 4,119,918 | 10/1978 | Moser | 328/165 |
| 4,929,851 | 5/1990 | Pace | 307/359 |
| 5,025,251 | 6/1991 | Mittel et al. | 340/825.44 |
| 5,140,698 | 8/1992 | Toko | 455/76 |
| 5,175,874 | 12/1992 | Auchter | 455/89 |
| 5,274,843 | 12/1993 | Murai et al. | 455/38.3 |
| 5,278,521 | 1/1994 | Sato | 331/14 |
| 5,303,420 | 4/1994 | Jang | 455/343 |
| 5,309,153 | 5/1994 | Gaskill et al. | 340/825.44 |
| 5,392,457 | 2/1995 | Davis et al. | 455/38.3 |
| 5,475,887 | 12/1995 | Adachi | 455/343 |
| 5,551,078 | 8/1996 | Connell et al. | 455/343 |

FOREIGN PATENT DOCUMENTS

| | | |
|---|---|---|
| 0473465A1 | 3/1992 | European Pat. Off. |
| 2276516 | 9/1994 | United Kingdom |
| WO 90/16133 | 12/1990 | WIPO |

*Primary Examiner*—Reinhard J. Eisenzopf
*Assistant Examiner*—Lee Nguyen
*Attorney, Agent, or Firm*—Kevin D. Kaschke

[57] ABSTRACT

In a communication unit a receiver (104) receives a modulated signal (118), and produces a received signal (120) having a parameter. The receiver (104) has a discontinuous receive mode of operation, wherein the receiver (104) is permitted to be turned on and off. Receiver circuitry (105) receives the received signal (120), and produces an output signal (124) having a parameter. A controller (110) adjusts a value of the parameter of the output signal (124), responsive to a value of the parameter of the received signal (120), during the times when the receiver (140) is turned on; and holds the value of the parameter of the output signal (124), responsive to the value of the parameter of the received signal (120), at the time when the receiver (104) is turned off. The present invention advantageously minimizes the turn on time for the receiver (104) operating in a discontinuous receive mode to save current drain.

19 Claims, 4 Drawing Sheets

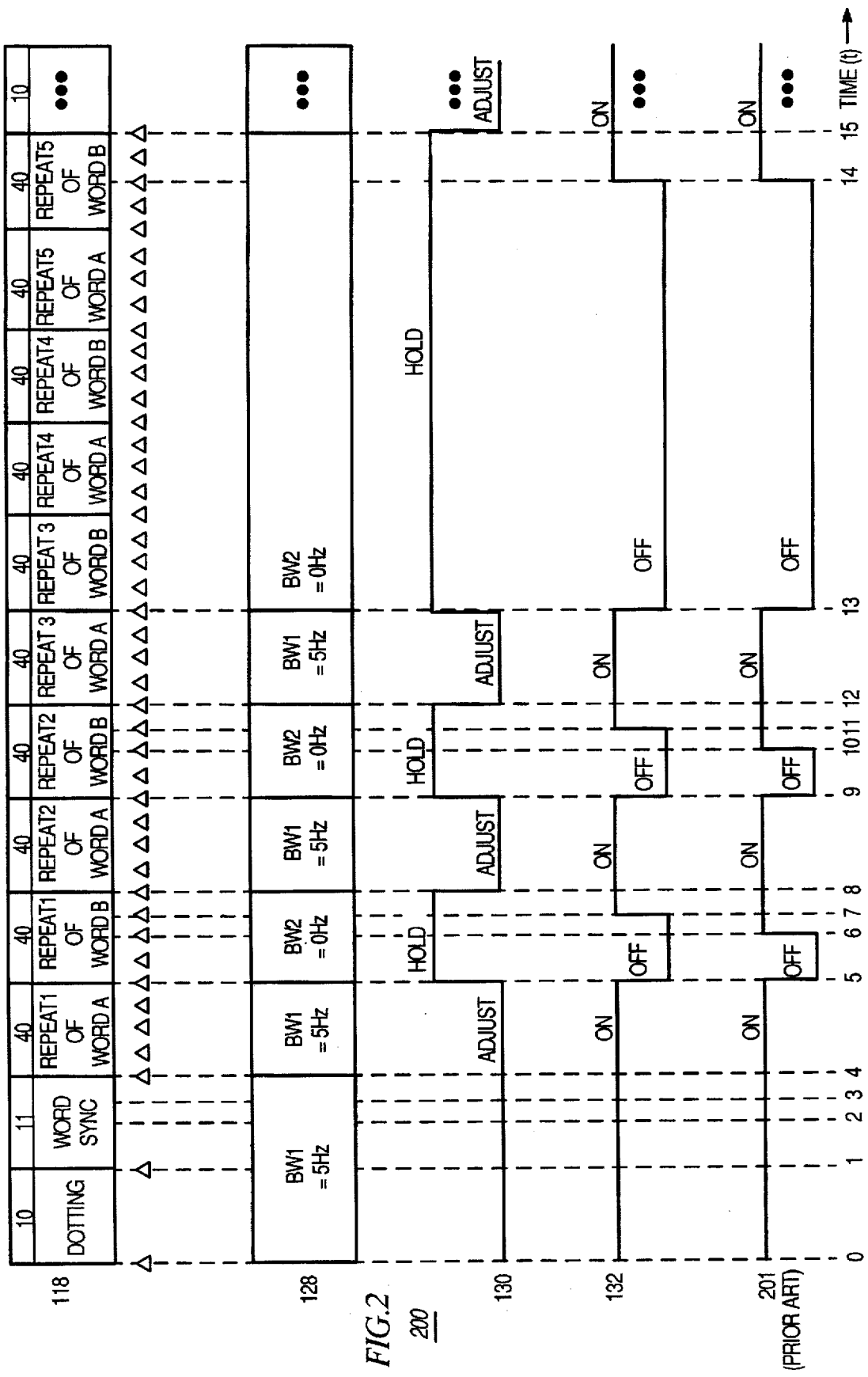
FIG.2 200 (PRIOR ART)

5,678,227

APPARATUS AND METHOD FOR MINIMIZING THE TURN ON TIME FOR A RECEIVER OPERATING IN A DISCONTINUOUS RECEIVE MODE

FIELD OF THE INVENTION

The present invention relates generally to receivers operating in a discontinuous receive mode and, more particularly, to an apparatus and a method for minimizing the turn on time for a receiver operating in a discontinuous receive mode.

BACKGROUND OF THE INVENTION

A communication system generally comprises at least one transmitter and at least one receiver. The communication system may be, for example, a cellular radiotelephone system having at least one base station, including a transmitter, and a plurality of subscriber radiotelephones, each including a receiver. The transmitter typically communicates signals to the receiver over a communication channel. When a transmitter is not communicating with a receiver, the receiver may operate in either a continuous receive mode or a discontinuous receive mode.

In the continuous receive mode of operation, the receiver continuously receives and decodes all signals sent by the transmitter until the receiver recognizes a signal intended for the receiver. A recognized signal may be a unique telephone number, for example. After the receiver recognizes the signal intended for the receiver, the receiver is then permitted to receive other signals sent by the transmitter over the communication channel, such as a telephone call, for example. The continuous receive operating mode is sometimes known as "stand-by mode".

In the discontinuous receive mode of operation, the receiver selectively receives and decodes signals sent by the transmitter until the receiver recognizes a signal intended for the receiver. After the receiver recognizes the signal intended for the receiver, the receiver is then permitted to receive other signals sent by the transmitter over the communication channel, such as a telephone call, for example. The discontinuous receive mode of operation is also sometimes called "intermittent receive mode". The receiver is able to selectively receive and decode signals sent by the transmitter by taking advantage of a predetermined communication relationship between the transmitter and the receiver. Such a predetermined communication relationship may be, for example, an intermittent signaling scheme used by the transmitter. The intermittent signaling scheme may be, for example, a time division multiple access (TDMA) signaling scheme used by conventional digital cellular radiotelephone systems. The intermittent signaling scheme permits the receiver to turn off its receive and decode functions during the times when the transmitter will not send a signal to the receiver, and to turn on its receive and decode functions during the times when the transmitter will send a signal to the receiver.

A distinction between receivers operating in continuous receive mode and receivers operating in discontinuous receive mode is the amount of current drain on the power supply of the receiver. When a receiver is portable such as in a portable radiotelephone, for example, minimizing current drain is desirable because the capacity of the power supply is limited. Any current saved while monitoring the communication channel when the receiver is not receiving a desired signal can be used to extend the time during which the receiver is receiving the desired signal. In a portable radiotelephone, for example, reduced current drain means the user enjoys longer talk time.

Although prior art portable receivers operating in discontinuous receive mode consume significantly less current drain from portable power supplies than receiver operating in continuous receiver mode, the desire to further extend service from portable receivers has caused the discontinuous receive mode of operation to be examined more closely. In a receiver operating in discontinuous receive mode, the required time for the receiver to turn on before the receiver is prepared to receive and decode signals on the communication channel, i.e., the "turn on time", is longer than the time taken for the receiver to turn off the receive and decode functions. The turn on time is longer because receiver circuitry and internal signals need be initialized and stabilized before a desirable signal can be received. The prior art has not addressed minimizing the turn on time of the receiver operating in discontinuous receive mode to further reduce the current drain on the power supply and thereby extend the time that the receiver could provide service.

Accordingly, there is a need for an apparatus and a method for minimizing the turn on time for a receiver operating in discontinuous receive mode to advantageously reduce current drain on the power supply thereby extending the time that the receiver could provide service.

BRIEF DESCRIPTION OF THE DRAWINGS

FIG. 2 illustrates a timing diagram showing signals used in the block diagram of the communication unit of FIG. 1, in accordance with the present invention.

DETAILED DESCRIPTION OF A PREFERRED EMBODIMENT

Figure 1:
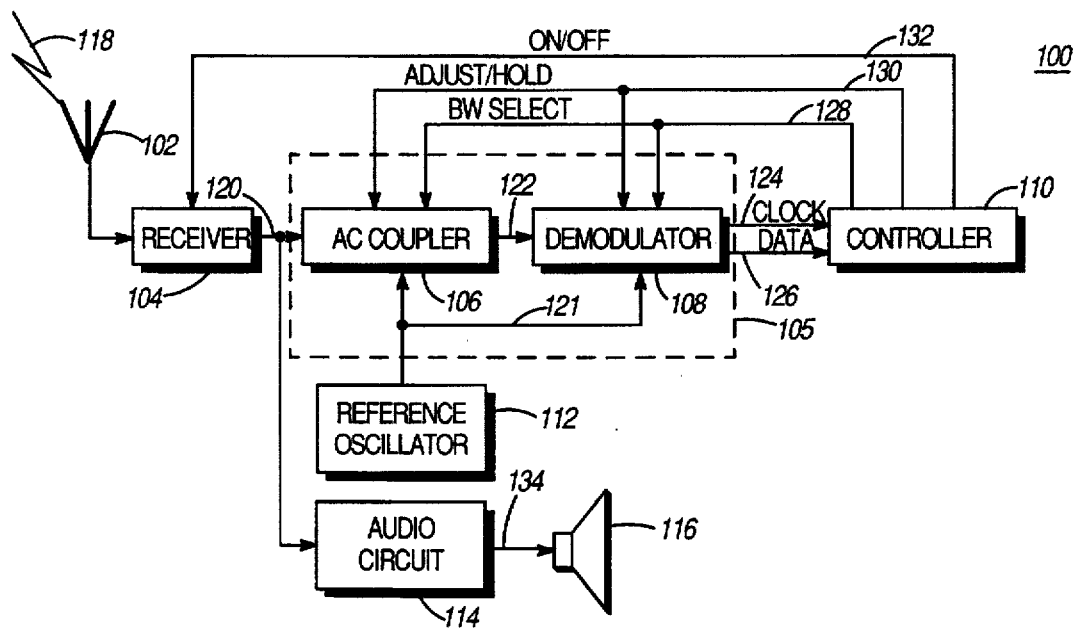
FIG. 1 illustrates a block diagram of a communication unit, in accordance with the present invention.

The present invention can be more fully described with reference to FIGS. 1–4, wherein FIG. 1 illustrates a block diagram of a communication unit 100, in accordance with the present invention. The communication unit 100 in FIG. 1 generally comprises an antenna 102, a receiver 104, receiver circuitry 105, a controller 110, a reference oscillator 112, an audio circuit 114 and a speaker 116. The receiver circuitry 105 preferably comprises an AC coupler 106 and a demodulator 108. Generally, the antenna 102, the receiver 104, the AC coupler 106, the demodulator 108, the controller 110, the reference oscillator 112, the audio circuit 114 and the speaker 116 are individually well known in the art, and hence no additional description need be provided here except as may be necessary to facilitate the understanding of the present invention. The communication unit 100 of FIG. 1 may also include a transmitter, a duplexer and a frequency synthesizer (each not shown) as is well known in the art.

In the communication unit 100, a modulated signal 118 is coupled to the receiver 104 via the antenna 102. The receiver 104 is coupled to receive the modulated signal 118 and a first control signal at line 132 and operative to process the modulated signal 118 to determine if the modulated signal 118 is desirable for the communication unit 100. If the modulated signal 118 is desirable the receiver 104 produces a received signal at line 120 having at least one parameter. If the modulated signal 118 is not desirable the receiver 104 does not produce the received signal at line 120. Preferably, the received signal at line 120 is a baseband signal. The AC coupler is coupled to receive the received signal at line 120, a reference signal at line 121, a second control signal at line 130, and a third control signal at line 128, and operative to produce an AC coupled signal at line 122. The demodulator is coupled to receive the AC coupled signal at line 122, the reference signal at line 121, the second control signal at line 130 and the third control signal at line 128, and operative to produce demodulated data at line 126 and a data clock signal at line 124. The reference oscillator 112 is operative to produce the reference signal at line 121 for input to the AC coupler 106 and the demodulator 108. The controller 110 is coupled to receive the demodulated data at line 126 and the data clock signal at line 124 and operative to produce the first, second and third control signals at lines 128, 130 and 132, respectively. The audio circuit is coupled to receive the received signal at line 120 and operative to produce an audio signal at line 134 for processing by the speaker 116.

The communication unit 100 is preferably a cellular radiotelephone operating in a cellular radiotelephone system. The cellular radiotelephone and the cellular radiotelephone system may communicate analog signals such provided in AMPS (Advanced Mobile Phone Service) systems, NAMPS (Narrow-band Advanced Mobile Phone Service) systems, JTACS (Japan Total Access Communication Service) systems and ETAC (Extended Total Access Communication Service) systems, or digital signals such as provided in TDMA (time division multiple access), GSM (Group System Mobile), and CDMA (Code Division Multiple Access). Alternatively, the communication unit 100 may be a pager, a portable data terminal, a personal digital assistant or a personal notebook.

The receiver 104 is a super heterodyne receiver. Alternatively, the receiver 104 may be a FM discriminator or a phase locked loop (PLL).

The receiver 104 has a discontinuous receive mode of operation, wherein the receiver 104 is permitted to be turned on and off. The discontinuous receive mode of operation of the receiver 104 permits the receiver 104 to be turned on and off by the controller 110 in the communication unit 100. Alternatively, the communication system in which the communication unit 100 operates may turn the receiver on and off via the transmitted modulated signal 118. This alternative is described in further detail, by example, in U.S. Pat. No. 5,140,698.

The modulated signal 118 is preferably a frequency modulated signal operating within the 849 MHz to 894 MHz band for cellular communications.

The receiver circuitry 105 is coupled to receive the received signal at line 120 and a control signal at line 128 or 130 and operative to produce an output signal at line 124 having at least one parameter. The controller 110 is coupled to receive the output signal at line 124 and operative to produce the control signal at line 128 or 130 for adjusting a value of the at least one parameter of the output signal at line 124, responsive to a value of the at least one parameter of the received signal at line 120, during the times when the receiver 104 is turned on; and holding the value of the at least one parameter of the output signal at line 124, responsive to the value of the at least one parameter of the received signal at line 120, during the times when the receiver 104 is turned off.

The controller 110 is a microcomputer, for example a Motorola™ 68HC11. Alternatively, the controller 110 may be a digital signal processor (DSP) such as one selected from the Motorola™ 56000 family of DSP's.

One parameter of the received signal at line 120 is DC bias. The AC coupler 106 tracks and reproduces the DC bias of the received signal at line 120 and has a decision threshold for producing a hard limited received signal at line 122 for the demodulator 108. In order for the AC coupler 106 to accurately track the DC bias, the AC coupler 106 needs a long time constant. The communication unit 100 typically operates on a 5 V supply. When the receiver 104 is turned on, the DC bias is typically 2-3 V. In the prior art when the receiver 104 is off, the DC bias could be between 0-5 V. If the DC bias is tracked while the receiver 104 is turned off, a relatively long recovery time would be needed for the AC coupler 106 to produce the correct DC bias when the receiver 104 is turned on. In the present invention, the DC bias is advantageously held between 2-3 V, when the receiver 104 is turned off to minimize the turn on time of the receiver 104. Alternatively, the parameter may be phase, frequency or amplitude.

The controller 110 is coupled to receive an indication of the phase and/or frequency of the received signal at line 120, and is operable to reference the duration of time for holding the value of the parameter of the output signal at line 124 responsive to the indication of the phase and/or frequency of the received signal at line 120. The data clock signal at line 124 is used as a time reference for controlling the length of time that the receiver is turned off. The modulated signal 118 is Manchester encoded. The demodulator 108 uses a windowing function for enabling only mid-bit edges of the Manchester encoded signal to correctly drive the clock recovery loop and for blocking bit boundary edges from steering the phase locked loop of the demodulator 108 in the wrong direction. In the prior art, the data clock signal at line 124 tracks noise when the receiver 104 is turned off, and could be as much as 180° out of phase when the receiver 104 is turned on. In the present invention, using the held data clock signal at line 124 as a reference for the time during which the receiver is turned off permits the window to be accurately reopened just before the mid-bit edge and immediately enables the clock recovery loop to be driven in the proper direction. By example, the clock at line 124 is 10 KHz±2.5 Hz for the NAMPS and AMPS systems, and 8 KHz±2 Hz for the JTAC and ETAC systems.

A rate of adjusting the value of the parameter of the output signal at line 124, responsive to the value of the parameter of the received signal at line 120, is characterized as bandwidth. A first bandwidth of the receiver circuitry 105 corresponds to the times when the receiver 104 is turned on. A second bandwidth of the receiver circuitry 105 corresponds to the times when the receiver 104 is turned off. The controller 110 controls the first bandwidth responsive to the duration of time that the receiver 104 is turned on causing the time average of the first and second bandwidth to be desirable. For example, for an adjust/hold duty cycle of 50% and a desirable bandwidth of 10 KHz±2.5 Hz for the NAMPS and AMPS systems, the second bandwidth is 10 KHz±0 Hz when the output signal at line 124 is held and the first bandwidth is 10 KHz±5 Hz when the output signal at line 124 is adjusting to produce an average bandwidth of 10 KHz±2.5 Hz. Without controlling the bandwidth responsive to the duration of time that the receiver 104 is turned on and off, the average bandwidth would be 10 KHz±1.25 Hz (10 KHz±2.5 Hz averaged with 10 KHz±0 Hz). This average bandwidth of 10 KHz±1.25 Hz is narrower than a bandwidth of 10 KHz±2.5 Hz and would cause signals which lie outside 10 KHz±1.25 Hz but within 10 KHz±2.5 Hz to be lost.

The controller 110 determines a duration of time that the receiver 104 is turned off; and adjusts the AC coupler 106 and the demodulator 108 at a time, responsive to the duration of time that the receiver 104 was turned off. When the receiver 104 is turned off, the received signal at line 120 drifts. The longer the receiver 104 is turned off, the farther the received signal at line 120 drifts. The farther the received signal at line 120 drifts, the longer the turn on time is needed to stabilize the receiver 104 before the received signal at line 120 may be processed. In the prior art, the turn on time was set to anticipate a worst case situation. In the present invention, the turn on time Of the receiver 104 is adjusted based on the amount of time that the receiver 104 was turned off. Thus, the turn on time is minimized before stable operation can commence.

The controller 110 determines the amount of time that the receiver 104 has been turned off by holding an indication of at least one of phase and frequency of the received signal at line 120; and measuring the duration of time that the receiver 104 has been turned off responsive to the indication of the at least one of phase and frequency of the received signal 120. Thus, the reference oscillator 112 need not be used as a timing reference. In the preferred embodiment, the indication is present at the data clock signal at line 124 when this signal is held.

The receiver circuitry 105 further comprises the AC coupler 106 and the demodulator 108, wherein the output signal at line 126 further comprises the demodulated data. The AC coupler 106 is described in further detail in FIG. 3. The demodulator 108 is described in further detail in FIG. 4.

In the preferred embodiment, the receiver 104 is coupled to receive a modulated signal 118, and operative to produce a received signal at line 120. The AC coupler 106 is coupled to receive the received signal at line 120, and operative to produce an AC coupled signal at line 122 having a parameter. A value of the parameter of the AC coupled signal at line 122 is adjusted, responsive to a value of the parameter of the received signal at line 120 during the times when the receiver 104 is turned on; and the value of the parameter of the AC coupled signal at line 122 is held responsive to the value of the parameter of the received signal at line 120 at the time when the receiver is turned off. The data demodulator 108 is coupled to receive the AC coupled signal at line 122, and operative to produce a data clock signal at line 124 having a parameter. A value of the parameter of the data clock signal at line 124 is adjusted responsive to a value of the parameter of the received signal at line 120 during the times when the receiver is turned on; and the value of the parameter of the data clock signal at line 124 is held responsive to the value of the parameter of the received signal at line 120 at the time when the receiver 104 is turned off. The controller 110 is coupled to receive the data clock signal at line 124, and operative to turn on and off the receiver 104, to adjust and hold the value of the parameter of the AC coupled signal, and to adjust and hold the value of the parameter of the data clock signal at line 124.

FIG. 2 illustrates a timing diagram 200 showing signals used in the block diagram of the communication unit 100 of FIG. 1, in accordance with the present invention. Generally, the signals represented in FIG. 2 include the modulated signal at line 118, the bandwidth control signal at line 128, the adjust/hold signal at line 130, and the on/off signal at line 132.

In the preferred embodiment, the modulated signal at line 118 is sent from a land station to the mobile station (communication unit 100) over a forward control channel (FOCC) in a continuous wideband data stream. A description of the communication between the land station and the communication unit 100 over the FOCC may be found in the TIA/EIA Interim Standard, Mobile Station—Land Station Compatibility Standard for Dual-Mode Narrow Band Analog Cellular Technology, IS-88, §3.7.1, January 1993, published by Telecommunications Industry Association 1993, 2001 Pennsylvania Ave. N.W., Washington, D.C. 20006.

The data stream is generated at a 10 kilobit/second +0.1 bit/second rate. Each FOCC consists of three discrete information streams, called stream A, stream B and busy-idle stream, that are time-multiplexed together. Messages to the communication unit 100 with the least significant bit of their identification number (see §2.3.1) equal to "0" are sent on stream A, and those with the least significant bit of their identification number equal to "1" are sent on stream B. The communication unit 100 reads only one of the two interleaved messages (A or B). The FIG. 2 timing diagram shows the example of the communication unit 100 reading the interleaved A word messages.

The busy-idle stream contains busy-idle bits (inserted at each arrow), which are used to indicate the current status of the reverse control channel. The reverse control channel is busy if the busy-idle bit is equal to "0" and idle if the busy-idle bit is equal to "1". A busy-idle bit is located at the beginning of each dotting sequence, at the beginning of each word sync sequence, at the beginning of the first repeat of word A, and after every 10 message bits thereafter.

A 10-bit dotting sequence (1010101010) and an 11-bit word sync sequence (11100010010) are sent to permit the communication unit 100 to achieve synchronization with incoming data. Each word contains 40 bits, including parity, and is repeated five times; it is then referred to as a word block. For a multi-word message, the second word block and subsequent word blocks are formed the same as the first word block including the 10-bit dotting and the 11-bit word sync sequences. A word is formed by encoding 28 content bits into a (40,28) BCH code that has a distance of 5, (40,28: 5). The left-most bit (i.e., the earliest in time) shall be designated as the most significant bit. The 28 most significant bits of the 40-bit field shall be the content bits. The generator polynomial for the (40,28: 5) BCH code is:

$$G_b(x) = x^{12} + x^{10} + x^8 + x^5 + x^4 + x^3 + x^0.$$

The code, a shortened version of the primitive (63, 51: 5) BCH code, is a systematic linear block code with the leading bit as the most significant information bit and the least significant bit as the last parity-check bit.

Each FOCC message can consist of one or more words. The types of messages to be transmitted over the FOCC are: communication unit control messages, overhead messages and control-filler messages. Control filler messages may be inserted between messages and between word blocks of a multi-word message.

The bandwidth control signal at line 128 sets the bandwidth of the demodulator 108 to a first value, for example 5 Hz, when word A is received, beginning at times t4, t8, and t12, and set to a second value, for example 0 Hz, when word B is received, beginning at times t5, t9, and t13. The first bandwidth is set to 5 Hz when the dotting and the sync words are received. The second bandwidth is set to 0 Hz when the fourth and fifth repeats of words A and B are received.

The adjust/hold control signal at line 130 adjusts the data clock signal at line 124 when word A is received, beginning at times t4, t8, and t12, and holds the data clock signal at line 124 when word B is received, beginning at times t5, t9, and t13. The adjust/hold control signal at line 130 adjusts the data clock signal at line 124 when the dotting and sync words are received, and holds the data clock signal at line 124 when the fourth and fifth repeats of words A and B are received. In the preferred embodiment, the adjust time of the receiver circuitry 105 is substantially the same whether holding for a long or a short time. However in other embodiments, the adjust time of the receiver circuitry 105 may be varied responsive to the duration of time that the receiver circuitry 105 was holding.

The on/off control signal at line 132 turns on the receiver 104 when word A is received, beginning at times t3, t7, and t11, and turns off the receiver 104 when word B is received, beginning at times t5, t9, and t13. The on/off control signal at line 132 turns on the receiver 104 when the dotting and sync words are received, and turns off the receiver 104 when the fourth and fifth repeats of words A and B are received.

The time at which the receiver 104 is turned on is dependent upon how long the receiver 104 had been turned off. When the receiver 104 has been off for a relatively short period of time it has not had much time to drift and, therefore, only needs a relatively short turn on time to allow the receiver 104 to initialize and stabilize prior to receiving the expected word. When the receiver 104 has been off for a relatively long period of time it has had more time to drift and, therefore, needs a relatively long turn on time to allow the receiver 104 to initialize and stabilize prior to receiving the expected word.

The controller 110 determines a duration of time that the receiver 104 has been turned off; and turns on the receiver 104 at a time prior to the arrival of the desirable data responsive to the duration of time that the receiver has been turned off. The controller 110 turns on the receiver 104, via the on/off control signal at line 132, at times t3, t7, t11 and t14. The motivation for turning on the receiver 104 at times t3, t7, t11 and t14 are described in U.S. Pat. No. 5,175,874, for example. By example, the turn on time for the second and third repeats of word A (t8-t7; and t12-t11) are one half the early turn on time for the next dotting sequence (t15-t14). Therefore, the amount of extra time that the receiver 104 may be advantageously turned off is represented by t7-t6 plus t11-t10, in this example.

By contrast, the on/off control signal 201 of the prior art required that the turn on time prior to each expected word (t8-t6, t12-t10, and t15-t14) be set to a constant worst case value. The worst case value represented the longest turn on time required by an expected word based on the longest time that the receiver could be turned off. In this example, the worst case value for turn on is represented by t15-t14. Since the same constant turn on time prior to receiving an expected word is applied to all the expected data, the receiver may turn on earlier than is needed, if the receiver were turned off for a relatively short period of time.

Figure 3:
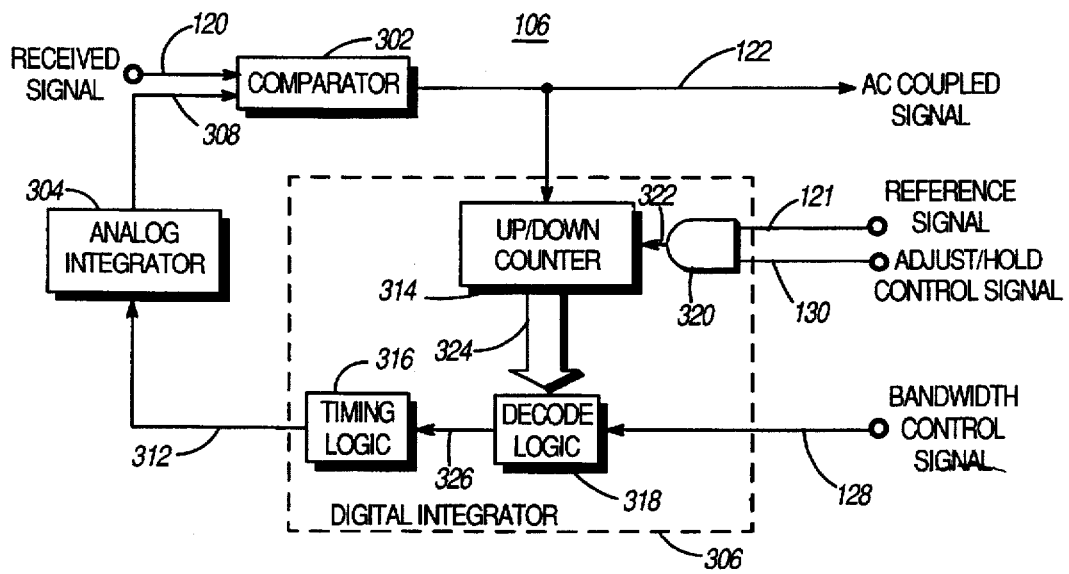
FIG. 3 illustrates a block diagram of an AC coupler shown in the block diagram of the communication unit of FIG. 1, in accordance with the present invention.

FIG. 3 illustrates a block diagram of the AC coupler 106 shown in the block diagram of the communication unit 100 of FIG. 1, in accordance with the present invention. The AC coupler 106 generally comprises a comparator 302, an analog integrator 304 and a digital integrator 306. The digital integrator 306 generally comprises an up/down counter 314, timing logic 316, decode logic 318 and a logical AND gate 320. Generally, the comparator 302, the analog integrator 304, the up/down counter 314, the timing logic 316, the decode logic 318 and the logical AND gate 320 are individually well known in the art, and hence no additional description need be provided here except as may be necessary to facilitate the understanding of the present invention. Generally, with the exception of the adjust/hold signal at line 130 and the bandwidth control signal at line 128, the AC coupler 106 is described in further detail in U.S. Pat. No. 4,996,529.

In the AC coupler 106, the comparator 302 is coupled to receive the received signal at line 120 and an analog integrated signal at line 308, and operable to produce the AC coupled signal at line 122 having a parameter. The digital integrator 306 is coupled to receive the AC coupled signal at line 122, a reference signal at line 121, the adjust/hold control signal at line 130, and the bandwidth control signal at line 128, and operative to produce a digitally integrated signal at line 312. The analog integrator 304 is coupled to receive the digitally integrated signal at line 312 and operative to produce the analog integrated signal at line 308.

Within the digital integrator 306, the logical AND gate 320 is coupled to receive the reference signal at line 121 and the adjust/hold control signal at line 130, and operative to produce a gated clock signal at line 322. The up/down counter 314 is coupled to receive the AC coupled signal at line 122 and the gated clock signal at line 322, and operative to produce a binary count signal at line 324. The decode logic is coupled to receive the binary count signal at line 324 and the bandwidth control signal at line 128 and operative to produce a decoded output signal at line 326. The timing logic 316 is coupled to receive the decoded output signal at line 326 and operative to produce the digitally integrated signal at line 312.

In accordance with the preferred embodiment as described in FIG. 1, the controller 110 is coupled to receive the AC coupled signal at line 122, and operative to produce the adjust/hold signal at line 130 for adjusting a value of the parameter of the AC coupled signal at line 122 responsive to a value of the parameter of the received signal at line 120 during the times when the receiver 104 is turned on; and holding the value of the parameter of the AC coupled signal at line 122 responsive to the value of the parameter of the received signal at line 120 at the time when the receiver 104 is turned off.

The rate of adjusting the value of the parameter of the AC coupled signal at line 122, responsive to the value of the parameter of the received signal at line 120, is characterized as bandwidth. A first bandwidth of the AC coupler 106 corresponds to the times when the receiver 104 is turned on. A second bandwidth of the AC coupler 106 corresponds to the times when the receiver 104 is turned off. The bandwidth control signal at line 128 is coupled to the digital integrator 306 and produced by the controller 110 for controlling the first bandwidth, responsive to the duration of time that the receiver 104 is turned on, causing the time average of the first and second bandwidth to be desirable. In the preferred embodiment, this is accomplished by the decode logic 318 selecting, responsive to the bandwidth control signal at line 128, different decode states of the up/down counter 314.

Figure 4:
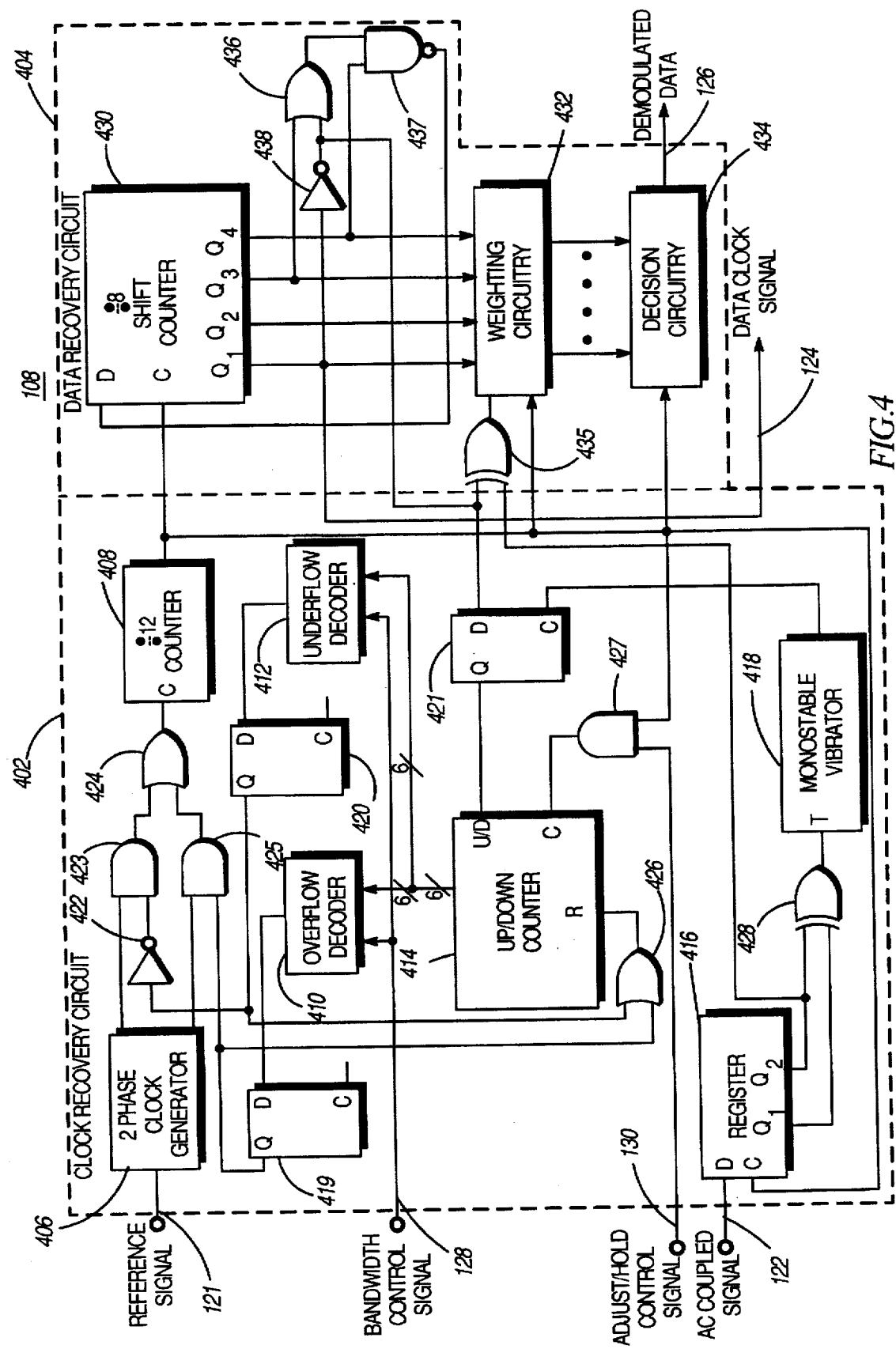
FIG. 4 illustrates a block diagram of a demodulator shown in the block diagram of the communication unit of FIG. 1, in accordance with the present invention.

FIG. 4 illustrates a block diagram of a demodulator 108 shown in the block diagram of the communication unit 100 of FIG. 1 in accordance with the present invention. The demodulator 108 of FIG. 4 generally comprises a clock recovery circuit 402 and a data recovery circuit 404. The clock recovery circuit 402 generally comprises a two phase clock generator 406, a counter 408, a overflow decoder 410, a underflow decoder 412, an up/down counter 414, a register 416, a monostable vibrator 418, flip flops 419–421, and various logic gates 422–428. The data recovery circuit 404 generally comprises a shift counter 430, weighting circuitry 432, decision circuitry 434, and various logic gates 435–438. Generally, the two phase clock generator 406, the counter 408, the overflow decoder 410, the underflow decoder 412, the up/down counter 414, the register 416, the monostable vibrator 418, the flip flops 419–421, and the various logic gates 422–428 of the clock recovery circuit 402, as well as the shift counter 430, the weighting circuitry 432, the decision circuitry 434, and the various logic gates 435–438 of the data recovery circuit 404 are individually well known in the art, and hence no additional description need be provided here except as may be necessary to facilitate the understanding of the present invention. Generally, with the exception of the gate 427, the demodulator 108 is described in further detail in U.S. Pat. No. 4,302,845.

The two phase clock generator 406 is coupled to receive the reference signal at line 121; the overflow decoder 410 and the underflow decoder 412 is coupled to receive the bandwidth control signal at line 128; the logical AND gate 427 is coupled to receive the adjust/hold control signal at line 130; and the register 416 is coupled to receive the AC coupled signal.

The demodulator 108 is coupled to receive the reference signal at line 121, the AC coupled signal at line 122, and the adjust/hold control signal at line 130 and operative to produce the data clock signal at line 124 having a parameter. In accordance with the preferred embodiment of the present invention as described in FIG. 1, the controller 110 is coupled to receive the data clock signal at line 124 and operative to produce the adjust/hold signal at line 130 for adjusting a value of the parameter of the data clock signal at line 124, responsive to a value of the parameter of the received signal at line 120, during the times when the receiver is turned on; and holding the value of the parameter of the data clock signal at line 124, responsive to the value of the parameter of the received signal at line 120, at the time when the receiver is turned off. In the preferred embodiment, this is accomplished by stopping the up/down counter 414 to hold the phase of the clock recovery circuit 402.

The rate of adjusting the value of the parameter of the data clock signal at line 124, responsive to the value of the parameter of the received signal at line 120, is characterized as bandwidth. A first bandwidth of the demodulator 108 corresponds to the times when the receiver 104 is turned on. A second bandwidth of the demodulator 108 corresponds to the times when the receiver 104 is turned off. The bandwidth control signal at line 128 is coupled to the demodulator 108 and produced by the controller 110 for controlling the first bandwidth, responsive to the duration of time that the receiver 104 is turned on, causing the time average of the first and second bandwidths to be desirable. The bandwidth control signal at line 128, coupled to the demodulator 108, is the same connection as shown in U.S. Pat. No. 4,302,845, but the bandwidth in the present invention is controlled for a different reason than the bandwidth in U.S. Pat. No. 4,302,845.

Figure 5:
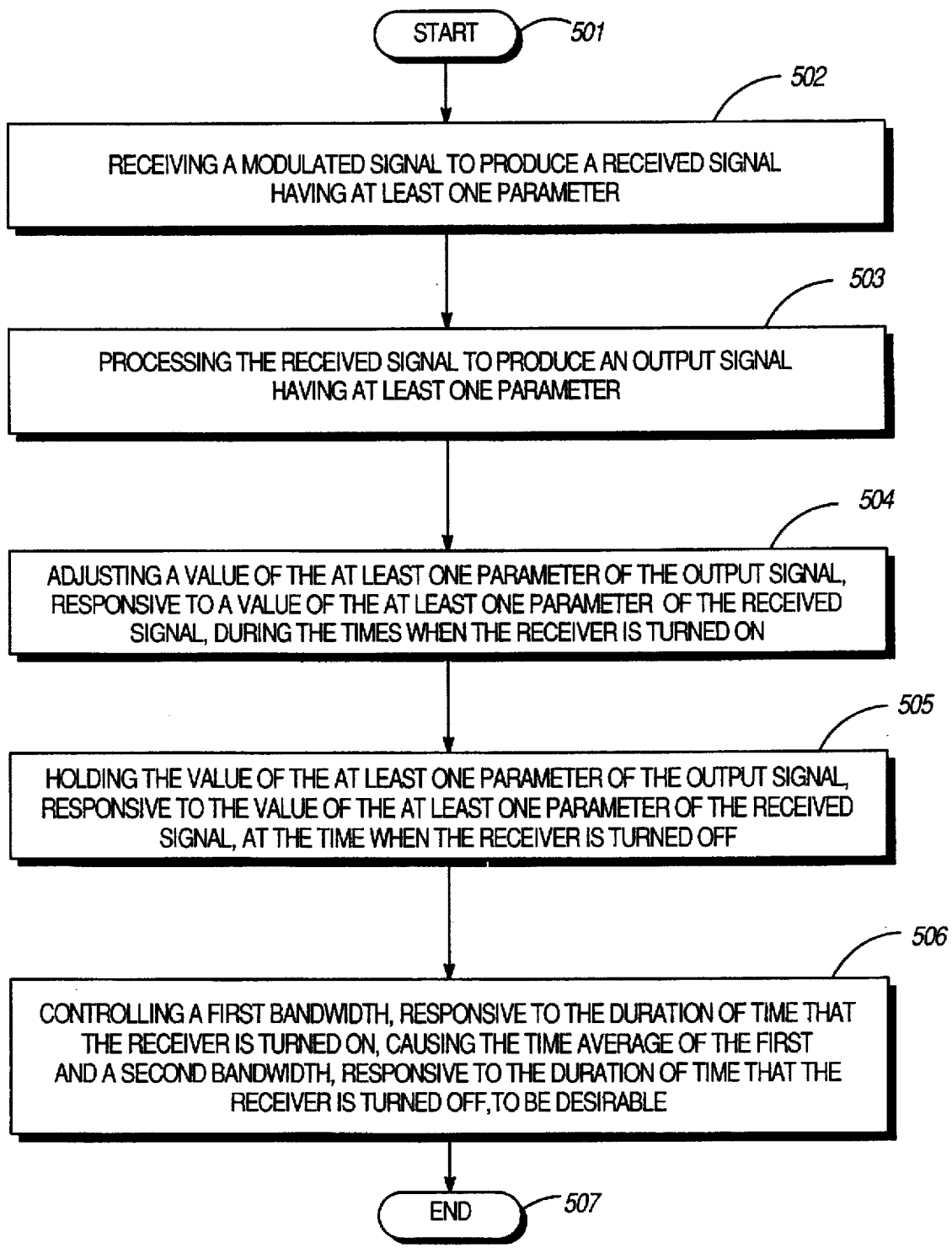
FIG. 5 illustrates a decision flow chart used by the communication unit of FIG. 1, in accordance with the present invention.

FIG. 5 illustrates a flow chart depicting a method of operation of the communication unit 100 of FIG. 1, in accordance with the present invention. The flow begins at step 501. At step 502, the receiver 104 receives the modulated signal 118 to produce the received signal at line 120 having a parameter. The communication unit 100 also includes receiver circuitry 105 for processing, at step 503, the received signal at line 120 to produce an output signal at line 124 having a parameter. At step 504, the controller 110 adjusts a value of the parameter of the output signal at line 124, responsive to a value of the parameter of the received signal at line 120, during the times when the receiver 104 is turned on; and holds, at step 505, the value of the parameter of the output signal at line 124, responsive to the value of the parameter of the received signal at line 120, at the time when the receiver 104 is turned off. The controller 110 also controls, at step 506, the first bandwidth of the receiver circuitry 105, responsive to the duration of time that the receiver 104 is turned on, causing the time average of the first bandwidth and the second bandwidth of the receiver circuitry 105, responsive to the duration of time that the receiver 104 is turned off, to be desirable. The flow ends at step 507.

Thus, the present invention provides an apparatus and a method for minimizing the start up time for a discontinuous receiver. One advantage is provided by the controller 110 operative to adjust a value of the parameter of the output signal of the receiver circuitry 105 responsive to a value of the parameter of the received signal at line 120 during the times when the receiver 104 is turned on; and to hold the value of the parameter of the output signal of the receiver circuitry 105 responsive to the value of the parameter of the received signal at line 120 at the time when the receiver 104 is turned off. Another advantage is provided by the controller 110 determining a duration of time that the receiver 104 has been turned off; and turning on the receiver 104 at a time prior to the arrival of the desirable data responsive to the duration of time that the receiver 104 has been turned off. With the present invention the problem of excessive current drain caused by the long turn on time of prior art receivers operating in discontinuous mode is substantially resolved.

What is claimed is:

1. In a communication unit including a receiver coupled to receive a modulated signal and operative to produce a received signal having at least one parameter, the receiver having a discontinuous receive mode of operation wherein the receiver is permitted to be turned on and off, an apparatus for minimizing a turn on time for the receiver operating in the discontinuous receive mode, the apparatus comprising:

receiver circuitry coupled to receive the received signal and a control signal and operative to produce an output data signal, having the at least one parameter, on a primary receive path; and a controller coupled to receive the output data signal and operative to produce the control signal for:

adjusting the output data signal on the primary receive path by adjusting a value of the at least one parameter of the output data signal on the primary receive path, responsive to a value of the at least one parameter of the received signal, during the times when the receiver is turned on; and holding the output data signal on the primary receive path by holding the value of the at least one parameter of the output data signal on the primary receive path, responsive to the value of the at least one parameter of the received signal, during the times when the receiver is turned off.

2. An apparatus according to claim 1 wherein the at least one parameter is DC bias.

3. An apparatus according to claim 1 wherein the at least one parameter is one of phase and frequency.

4. An apparatus according to claim 3 wherein the controller is coupled to receive an indication of the one of phase and frequency of the received signal, and is operable to reference the duration of time for holding the value of the at least one parameter of the output data signal, responsive to the indication of the at least one of phase and frequency of the received signal.

5. An apparatus according to claim 1:

wherein a rate of adjusting the value of the at least one parameter of the output data signal responsive to the value of the at least one parameter of the received signal is characterized as bandwidth, a first bandwidth of the receiver circuitry corresponds to the times when the receiver is turned on, a second bandwidth of the receiver circuitry corresponds to the times when the receiver is turned off; and wherein the controller controls the first bandwidth responsive to a duration of time that the receiver is turned on, causing the time average of the first and second bandwidth to be desirable.

6. An apparatus according to claim 1 wherein the controller determines a duration of time that the receiver is turned off, and adjusts the receiver circuitry at a time responsive to the determined time duration that the receiver is turned off.

7. An apparatus according to claim 1 wherein the receiver circuitry further comprises an AC coupler for producing an AC coupled signal, and wherein the output data signal further comprises the AC coupled signal.

8. An apparatus according to claim 1 wherein the receiver circuitry further comprises a demodulator for producing a demodulated signal, and wherein the output signal further comprises the demodulated signal.

9. In a communication unit including a receiver coupled to receive a modulated signal and operative to produce a received signal having at least one parameter, the receiver having a discontinuous receive mode of operation wherein the receiver is permitted to be turned on and off, an apparatus for minimizing a turn on time for the receiver operating in the discontinuous receive mode, the apparatus comprising:

an AC coupler comprising:
a comparator coupled to receive the received signal and an analog integrated signal and operative to produce an AC coupled signal having a parameter;

a digital integrator coupled to receive the AC coupled signal, a reference signal, and an adjust/hold control signal, and operative to produce a digital integrated signal; and an analog integrator coupled to receive the digital integrated signal and operative to produce the analog integrated signal; and a controller coupled to receive the AC coupled signal and operative to produce the adjust/hold signal for:
adjusting a value of the at least one parameter of the AC coupled signal, responsive to a value of the at least one parameter of the received signal, during the times when the receiver is turned on; and holding the value of the at least one parameter of the AC coupled signal, responsive to the value of the at least one parameter of the received signal, during the times when the receiver is turned off.

10. An apparatus in accordance with claim 9:
wherein a rate of adjusting the value of the at least one parameter of the output data signal responsive to the value of the at least one parameter of the received signal is characterized as bandwidth, a first bandwidth of the AC coupler corresponds to the times when the receiver is turned on, a second bandwidth of the AC coupler corresponds to the times when the receiver is turned off; and wherein the controller produces a bandwidth control signal, coupled to the digital integrator, for controlling the first bandwidth, responsive to a duration of time that the receiver is turned on, causing the time average of the first and second bandwidth to be desirable.

11. In a communication unit including a receiver coupled to receive a modulated signal and operative to produce a received signal having at least one parameter, the receiver having a discontinuous receive mode of operation wherein the receiver is permitted to be turned on and off, an apparatus for minimizing a turn on time for the receiver operating in the discontinuous receive mode, the apparatus comprising:

a demodulator coupled to receive a reference signal, an AC coupled signal, and an adjust/hold control signal and operative to produce a data clock signal having the at least one parameter; and a controller coupled to receive the data clock signal and operative to produce the adjust/hold signal for:
adjusting a value of the at least one parameter of the data clock signal, responsive to a value of the at least one parameter of the received signal, during the times when the receiver is turned on; and holding the value of the at least one parameter of the data clock signal, responsive to the value of the at least one parameter of the received signal, during the times when the receiver is turned off.

12. An apparatus in accordance with claim 11:
wherein a rate of adjusting the value of the at least one parameter of the data clock signal responsive to the value of the at least one parameter of the received signal is characterized as bandwidth, a first bandwidth of the demodulator corresponds to the times when the receiver is turned on, a second bandwidth of the demodulator corresponds to the times when the receiver is turned off; and wherein the controller produces a bandwidth control signal, coupled to the demodulator, for controlling the first bandwidth, responsive to a duration of time that the receiver is turned on, causing the time average of the first and second bandwidth to be desirable.

13. A communication unit comprising:
a receiver coupled to receive a modulated signal and operative to produce a received signal;

an AC coupler coupled to receive the received signal, and operative to produce an AC coupled signal having at least one parameter, wherein:
a value of the at least one parameter of the AC coupled signal is adjusted, responsive to a value of the at least one parameter of the received signal, during the times when the receiver is turned on; and the value of the at least one parameter of the AC coupled signal is held, responsive to the value of the at least one parameter of the received signal, at the time when the receiver is turned off;

a data demodulator coupled to receive the AC coupled signal, and operative to produce a data clock signal having at least one parameter wherein:
a value of the at least one parameter of the data clock signal is adjusted, responsive to a value of the at least one parameter of the received signal, during the times when the receiver is turned on; and the value of the at least one parameter of the data clock signal is held, responsive to the value of the at least one parameter of the received signal, at the time when the receiver is turned off; and a controller coupled to receive the data clock signal and operative to turn on and off the receiver, to adjust and hold the value of the at least one parameter of the AC coupled signal, and to adjust and hold the value of the at least one parameter of the data clock signal.

14. In a communication unit including a receiver coupled to receive a modulated signal and operative to produce a received signal having at least one parameter, the receiver having a discontinuous receive mode of operation wherein the receiver is permitted to be turned on and off, the communication unit including receiver circuitry coupled to receive the received signal and operative to produce an output data signal, having the at least one parameter, on a primary receive path, a method for minimizing a turn on time for the receiver operating in the discontinuous receive mode, the method comprising the steps of:

adjusting the output data signal on the primary receive path by adjusting a value of the at least one parameter of the output data signal on the primary receive path, responsive to a value of the at least one parameter of the received signal, during the times when the receiver is turned on; and holding the output data signal on the primary receive path by holding the value of the at least one parameter of the output data signal on the primary receive path, responsive to the value of the at least one parameter of the received signal, during the times when the receiver is turned off.

15. A method according to claim 14 wherein the at least one parameter is DC bias.

16. A method according to claim 14 wherein the at least one parameter is one of phase and frequency.

17. A method according to claim 16 further comprising the step of referencing the duration of time of the step of holding the value of the at least one parameter of the output data signal responsive to the one of phase and frequency of the received signal.

18. A method according to claim 14 wherein a rate of adjusting to the value of the parameter of the output data signal responsive to the value of the at least one parameter of the received signal is characterized as bandwidth, a first bandwidth of the receiver circuitry corresponds to the times when the receiver is turned on, a second bandwidth of the receiver circuitry corresponds to the times when the receiver is turned off, the method further comprising the step of:

controlling the first bandwidth, responsive to a duration of time that the receiver is turned on, causing the time average of the first and second bandwidth, responsive to the duration of time that the receiver is turned off, to be desirable.

19. A method according to claim 14 further comprising the steps of:

determining a duration of time that the receiver is turned off; and adjusting the receiver circuitry at a time responsive to the determined duration of time that the receiver is turned off.

* * * * *